US011600118B2

(12) United States Patent
Aoyagi et al.

(10) Patent No.: US 11,600,118 B2
(45) Date of Patent: Mar. 7, 2023

(54) INFORMATION PROCESSING APPARATUS, INFORMATION PROCESSING METHOD, AND INFORMATION PROCESSING PROGRAM

(71) Applicant: NEC Corporation, Tokyo (JP)

(72) Inventors: Toru Aoyagi, Tokyo (JP); Yoshiko Imanishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 17/260,658

(22) PCT Filed: Jul. 5, 2019

(86) PCT No.: PCT/JP2019/026794
§ 371 (c)(1),
(2) Date: Jan. 15, 2021

(87) PCT Pub. No.: WO2020/022034
PCT Pub. Date: Jan. 30, 2020

(65) Prior Publication Data
US 2021/0264184 A1      Aug. 26, 2021

(30) Foreign Application Priority Data

Jul. 25, 2018 (JP) .............................. JP2018-139375

(51) Int. Cl.
*G06V 40/40* (2022.01)
*G06V 30/40* (2022.01)
*G06V 40/16* (2022.01)

(52) U.S. Cl.
CPC ............. *G06V 40/45* (2022.01); *G06V 30/40* (2022.01); *G06V 40/166* (2022.01); *G06V 40/172* (2022.01)

(58) Field of Classification Search
CPC ...... G06V 40/45; G06V 30/40; G06V 40/166; G06V 40/172; G06V 40/174;
(Continued)

(56) References Cited

U.S. PATENT DOCUMENTS 9,495,586 B1 * 11/2016 Hagen .................... G06F 21/32
2001/0054951 A1 * 12/2001 Kimoto .................... G07C 9/10
340/5.52
2002/0198731 A1 * 12/2002 Barnes ................. G06Q 50/265
705/325

(Continued)

FOREIGN PATENT DOCUMENTS

JP     2003-317100 A     11/2003
JP     2006-251944 A      9/2006
(Continued)

OTHER PUBLICATIONS

International Search Report for PCT Application No. PCT/JP2019/026794, dated Oct. 8, 2019.

*Primary Examiner* — Nimesh Patel
(74) *Attorney, Agent, or Firm* — Sughrue Mion, PLLC

(57) ABSTRACT

The accuracy of identity authentication is further improved. There is provided an information processing apparatus including a first determiner that determines whether a face of a user and an identity verification document are captured in a moving image at a same time, a second determiner that makes, when the first determiner determines that the face and the identity verification document are captured at the same time, a notification of an action instruction, and determines whether the user acts in accordance with the action instruction, and a verifier that verifies, when the second determiner determines that the user acts in accordance with the action instruction, that the identity verification document belongs to the user.

20 Claims, 16 Drawing Sheets

(58) Field of Classification Search
CPC ...... G06V 40/161; G06V 40/70; G06V 40/16;
G06V 40/40; G06V 40/168; G06V 10/40;
G06V 40/197; G06V 40/67; G06V 10/82;
G06V 40/176; G06V 10/764; G06V
40/165; G06V 40/1388; G06V 30/194;
G06V 40/15; G06V 40/179; G06V 40/23;
G06V 40/173; G06V 40/178; G06F
21/32; G06F 2221/2133; G06F 21/31;
G06F 2221/2117; G06F 2221/2113; G06F
2221/2139; G06F 2207/4824; G06F
2221/2103; G06F 2221/2129; H04W
12/06; H04W 12/65; H04W 12/065;
H04W 12/68; H04W 12/12; G06Q
20/40145; G06Q 20/4014; G06Q
20/3674; G06T 2207/30201; G06T
2207/10048; G06T 2207/30168; G06T
7/0002; G06T 2207/20084; G06T
2207/20081; G06T 1/0007; G06T 7/00;
G06T 7/97; G06T 2207/10016
See application file for complete search history.

(56) References Cited

U.S. PATENT DOCUMENTS

| | | | |
|---|---|---|---|
| 2010/0177939 A1 | 7/2010 | Hamada | |
| 2010/0308108 A1* | 12/2010 | Choi | G07C 9/257 235/382 |
| 2014/0270411 A1* | 9/2014 | Shu | G06V 10/757 382/118 |
| 2016/0373437 A1* | 12/2016 | He | G06V 40/20 |
| 2017/0032485 A1* | 2/2017 | Vemury | G06Q 50/265 |
| 2017/0351909 A1* | 12/2017 | Kaehler | G06K 9/6257 |

FOREIGN PATENT DOCUMENTS

| | | |
|---|---|---|
| JP | 2014-235655 A | 12/2014 |
| JP | 2017-027492 A | 2/2017 |
| JP | 2017-049867 A | 3/2017 |
| JP | 2018-504703 A | 2/2018 |
| JP | 2018-109935 A | 7/2018 |
| WO | 2009/004916 A1 | 1/2009 |
| WO | 2013/114806 A1 | 8/2013 |

* cited by examiner

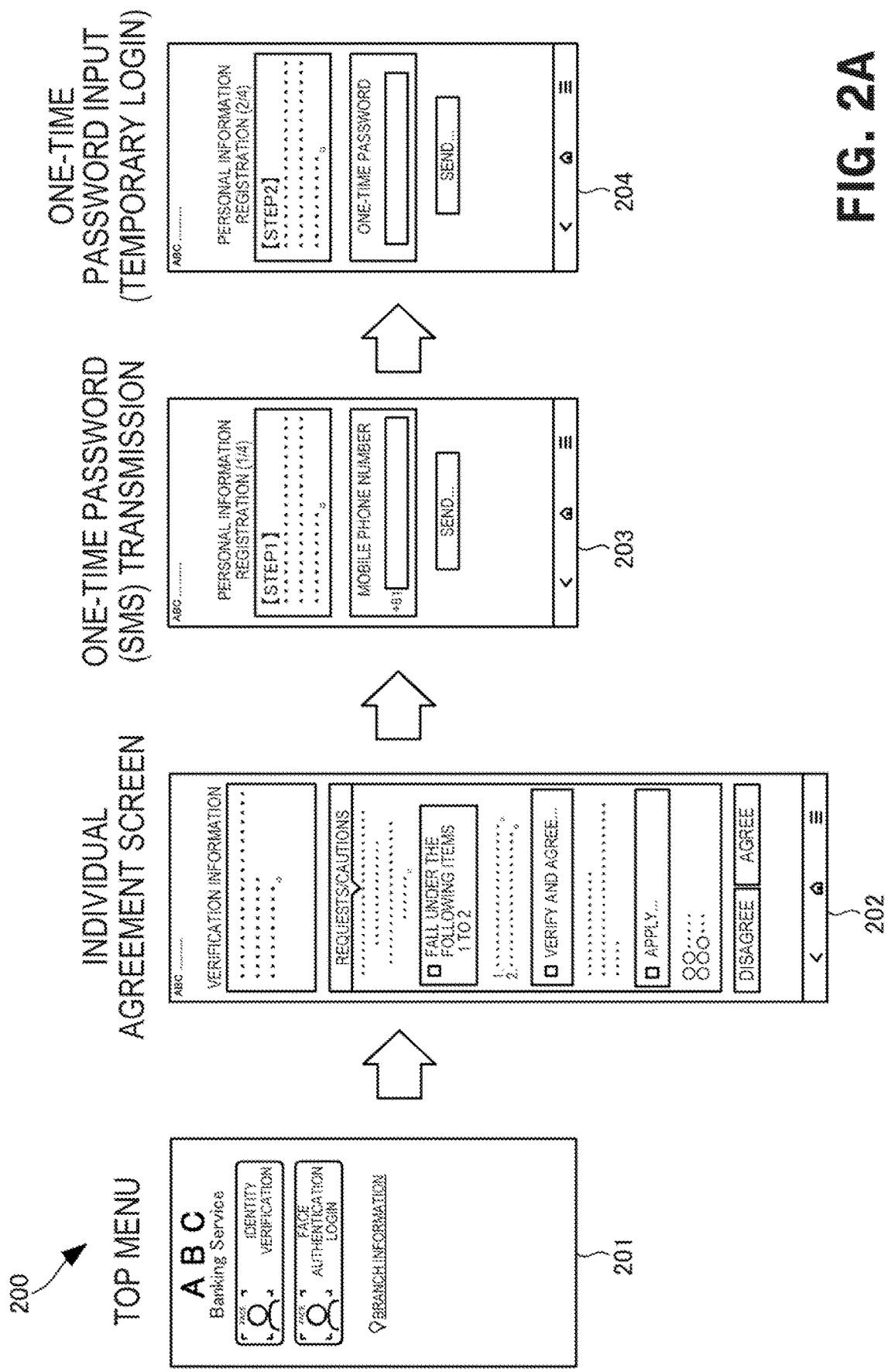

331

| LIVENESS INSTRUCTION ID | LIVENESS ACTION | | | | | | |
|---|---|---|---|---|---|---|---|
| | CLOSING RIGHT EYE | CLOSING LEFT EYE | CLOSING BOTH EYES | INCLINING FACE TO RIGHT | INCLINING FACE TO LEFT | TURNING FACE TO FRONT | ... |
| | | | | | | | |
| | | | | | | | |
| | | | | | | | |
| | | | | | | | |
| ... | ... | ... | ... | ... | ... | ... | ... |

401 → LIVENESS INSTRUCTION ID
402 → LIVENESS ACTION

FIG. 4

INFORMATION PROCESSING APPARATUS, INFORMATION PROCESSING METHOD, AND INFORMATION PROCESSING PROGRAM

This application is a National Stage Entry of PCT/JP2019/026794 filed on Jul. 5, 2019, which claims priority from Japanese Patent Application 2018-139375 filed on Jul. 25, 2018, the contents of all of which are incorporated herein by reference, in their entirety.

This application is based upon and claims the benefit of priority from Japanese patent application No. 2018-139375, filed on Jul. 25, 2018, the disclosure of which is incorporated herein in its entirety by reference.

TECHNICAL FIELD

The present invention relates to an information processing apparatus, an information processing method, and an information processing program.

BACKGROUND ART

In the above technical field, patent literature 1 discloses a technique of opening an account of a financial institution via a network. In patent literature 1, identity verification is performed by a match between image information read by a scanner and identity verification information input by the user. Patent literature 2 discloses an identity verification technique using collation of face images of a user, that prevents spoofing by instructing the direction of a face and blinking. Furthermore, patent literature 3 discloses an identity verification technique using a change in corneal reflection caused by movement of the direction of a face.

CITATION LIST

Patent Literature

Patent literature 1: Japanese Patent Laid-Open No. 2006-251944
Patent literature 2: Japanese Patent Laid-Open No. 2003-317100
Patent literature 3: Japanese Patent Laid-Open No. 2018-504703

SUMMARY OF THE INVENTION

Technical Problem

However, even if the techniques described in the above literatures are applied to identity verification in opening an account from a terminal, it takes labor to input user information necessary for eligibility examination.

The present invention provides a technique of solving the above-described problem.

Solution to Problem

One example aspect of the present invention provides an information processing apparatus comprising:
a first determiner that determines whether a face of a user and an identity verification document are captured in a moving image at a same time;
a second determiner that makes, when said first determiner determines that the face and the identity verification document are captured at the same time, a notification of an action instruction, and determines whether the user acts in accordance with the action instruction; and
a verifier that verifies, when said second determiner determines that the user acts in accordance with the action instruction, that the identity verification document belongs to the user.

Another example aspect of the present invention provides an information processing method comprising:
determining whether a face of a user and an identity verification document are captured in a moving image at a same time;
making, when it is determined that the face and the identity verification document are captured at the same time, a notification of an action instruction, and determining whether the user acts in accordance with the action instruction; and
verifying, when it is determined that the user acts in accordance with the action instruction, that the identity verification document belongs to the user.

Still other example aspect of the present invention provides an information processing program for causing a computer to execute a method, comprising:
determining whether a face of a user and an identity verification document are captured in a moving image at a same time;
making, when it is determined that the face and the identity verification document are captured at the same time, a notification of an action instruction, and determining whether the user acts in accordance with the action instruction; and
verifying, when it is determined that the user acts in accordance with the action instruction, that the identity verification document belongs to the user.

Advantageous Effects of Invention

According to the present invention, it is possible to reduce the labor to input user information necessary for eligibility examination.

BRIEF DESCRIPTION OF DRAWINGS

FIG. 2A is a view for explaining an overview of the operation of an information processing apparatus according to the second example embodiment of the present invention;

FIG. 4 is a table showing an example of a determination table included in the information processing apparatus according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus that performs identity authentication in an account opening procedure in Internet banking or the like.

Figure 1:
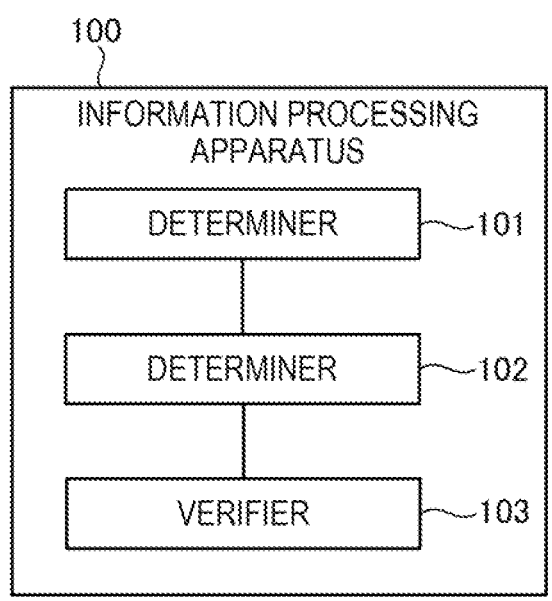
FIG. 1 is a block diagram showing the arrangement of an information processing apparatus according to the first example embodiment of the present invention.

As shown in FIG. 1, the information processing apparatus 100 includes a determiner 101, a determiner 102 and a verifier 103.

The determiner 101 determines whether the face of the user and an identity verification document are captured in a moving image at a same time. When the determiner 101 determines that the face and the identity verification document are captured at the same time, the determiner 102 makes a notification of an action instruction, and determines whether the user acts in accordance with the action instruction. When the determiner 102 determines that the user acts in accordance with the action instruction, the verifier 103 verifies that the identity verification document belongs to the user.

According to this example embodiment, it is possible to reduce the labor to input user information necessary for eligibility examination.

Second Example Embodiment

Figure 2B:
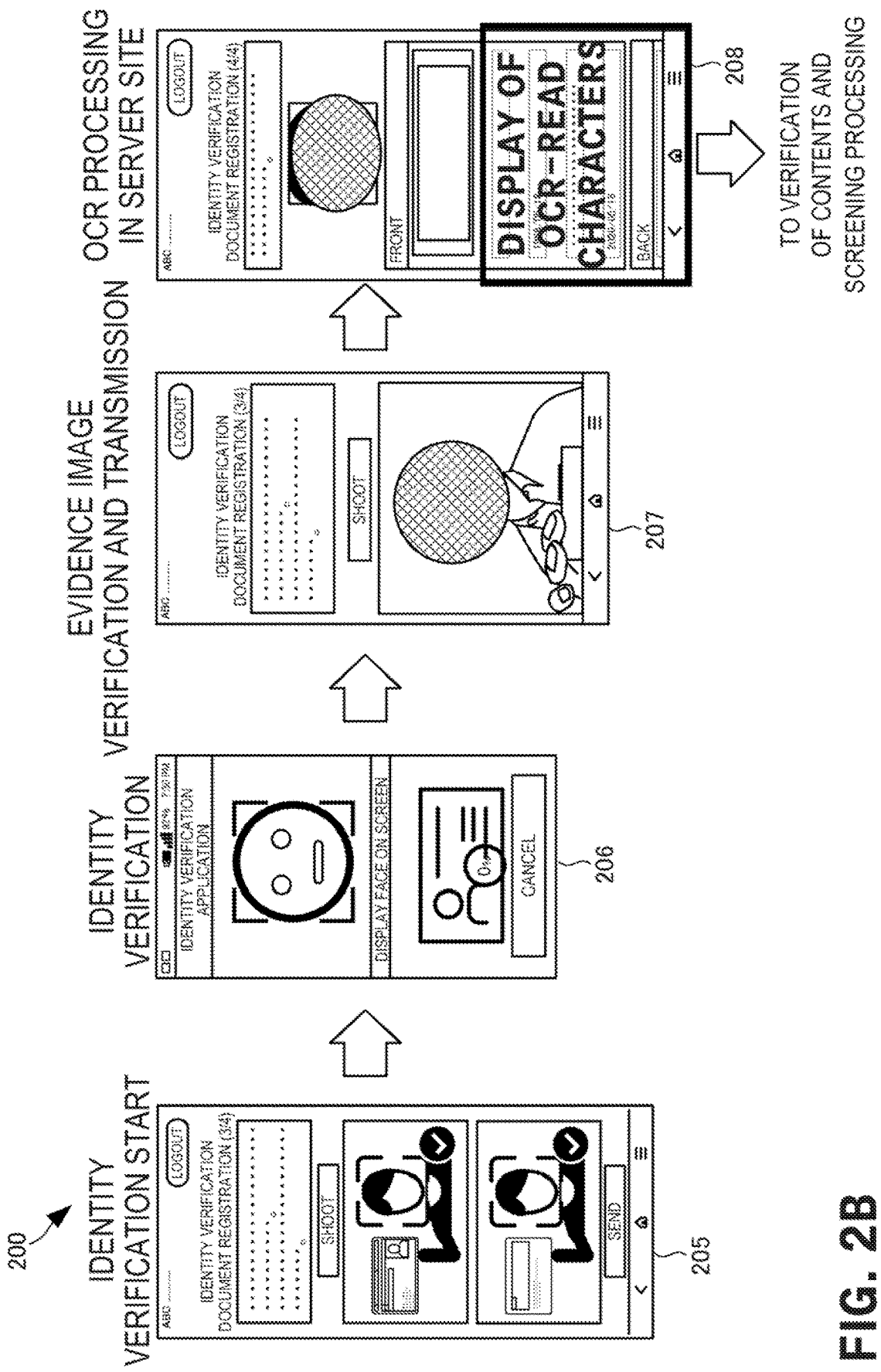
FIG. 2B is another view for explaining an overview of the operation of the information processing apparatus according to the second example embodiment of the present invention.

An information processing apparatus according to the second example embodiment of the present invention will be described next with reference to FIGS. 2A to 6C. FIG. 2A is a view for explaining an overview of the operation of the information processing apparatus according to this example embodiment. FIG. 2B is another view for explaining an overview of the operation of the information processing apparatus according to this example embodiment.

An information processing apparatus 200 is an apparatus that performs identity authentication in an account opening procedure in Internet banking, an online securities transaction, or another financial transaction. Note that the information processing apparatus 200 is a mobile terminal such as a smartphone. Therefore, display screens (201 to 208) shown in FIGS. 2A and 2B are displayed on the display of the information processing apparatus 200. An account opening application having a function of performing identity authentication (identity verification) is installed on the information processing apparatus 200.

If the user taps an icon of the account opening application displayed on the display of the information processing apparatus 200 to open an account, the information processing apparatus 200 executes activation processing of the application. Upon completion of the activation processing of the application, the top menu 201 is displayed on the display of the information processing apparatus 200. The user taps an icon of a desired procedure in the top menu 201. If the user taps the icon of the desired procedure, the information processing apparatus 200 displays the individual agreement screen 202. Disclaimers, agreement, and the like are displayed in the individual agreement screen 202, and if the user agrees to the displayed contents, the information processing apparatus 200 displays the next screen (203).

The information processing apparatus 200 displays the one-time password transmission screen 203, and transmits a password (one-time password) for a temporary login operation to the user using SMS (Short Message Service) or the like. After transmitting the one-time password, the information processing apparatus 200 displays the temporary login screen 204. The user inputs the transmitted one-time password to the one-time password input region of the temporary login screen 204 to temporarily log in to a system for account opening.

Upon completion of the temporary login operation of the user, the information processing apparatus 200 displays the identity verification start screen 205 of the user, and executes the identity verification operation of the user. The user captures an image using, for example, the front camera of the information processing apparatus 200 (smartphone) so that the face of the user and an identity verification document such as a driver's license fit in a predetermined frame of the identity verification screen 206. Note that the face of the user and the identity verification document are captured in a moving image mode. The identity verification document is a so-called identification card with a face photo, and includes, for example, a license, a passport, an individual number card with a face photo (My Number Card), and a residence card. However, the identity verification document is not limited to them, and any identification card with a face photo, which is usable for identity verification, may be used.

The user captures an image by a camera so that the face of the user fits in a predetermined frame in an upper portion of the identity verification screen 206, and captures an image by the camera so that the identity verification document fits in a predetermined frame in a lower portion of the identity verification screen 206. Then, the information processing apparatus 200 determines extraction of the face of the user from the captured moving image of the user. Determination of extraction of the face corresponds to determination of whether the feature of the face is included in the moving image. Furthermore, the information processing apparatus 200 determines extraction of the face of the identity verification document from the captured moving image of the identity verification document of the user.

At this time, the information processing apparatus 200 executes authentication for preventing spoofing of the user and the like. Note that the timing of the authentication operation for preventing spoofing of the user and the like is not limited to this.

To execute anti-spoofing authentication (liveness authentication), for example, the information processing apparatus 200 instructs the user, who is operating the account opening application using the information processing apparatus 200, to perform a predetermined action. Then, if the user performs the predetermined action in accordance with the instruction, it can be ensured that the user is present in front of the information processing apparatus 200 and is actually operating the application.

That is, if the user cannot perform the action in accordance with the instruction from the information processing apparatus 200, it is known that the user is not present there, and it is thus possible to prevent unauthorized account opening by spoofing using a video image or the like. Note that examples of the action used for anti-spoofing authentication are an action of winking the right eye, an action of winking the left eye, an action of closing both eyes, an action of inclining the face to the right, an action of inclining the face to the left, and an action of turning the face to the front, but are not limited to them. For example, an action of smiling (raising the corners of the mouth), an action of changing the direction of the line of sight, and the like may be possible.

After the end of spoofing authentication, the information processing apparatus 200 collates the face of the user with the face of the user of the photo of the identity verification document, thereby performing identity authentication. Identity authentication is performed by, for example, comparing and collating the feature of the face of the user and that of the face of the identity verification document with each other. Then, the information processing apparatus 200 displays the evidence image verification and transmission screen 207, and executes the OCR (Optical Character Recognition) processing 208 of the face image of the user and the image of the identity verification document, both of which are acquired in the identity verification screen 206, thereby reading information described on the identity verification document. After that, verification of contents of the read information, screening processing (determination of whether the user is a person who is prohibited from opening an account), and the like are performed.

Figure 2C:
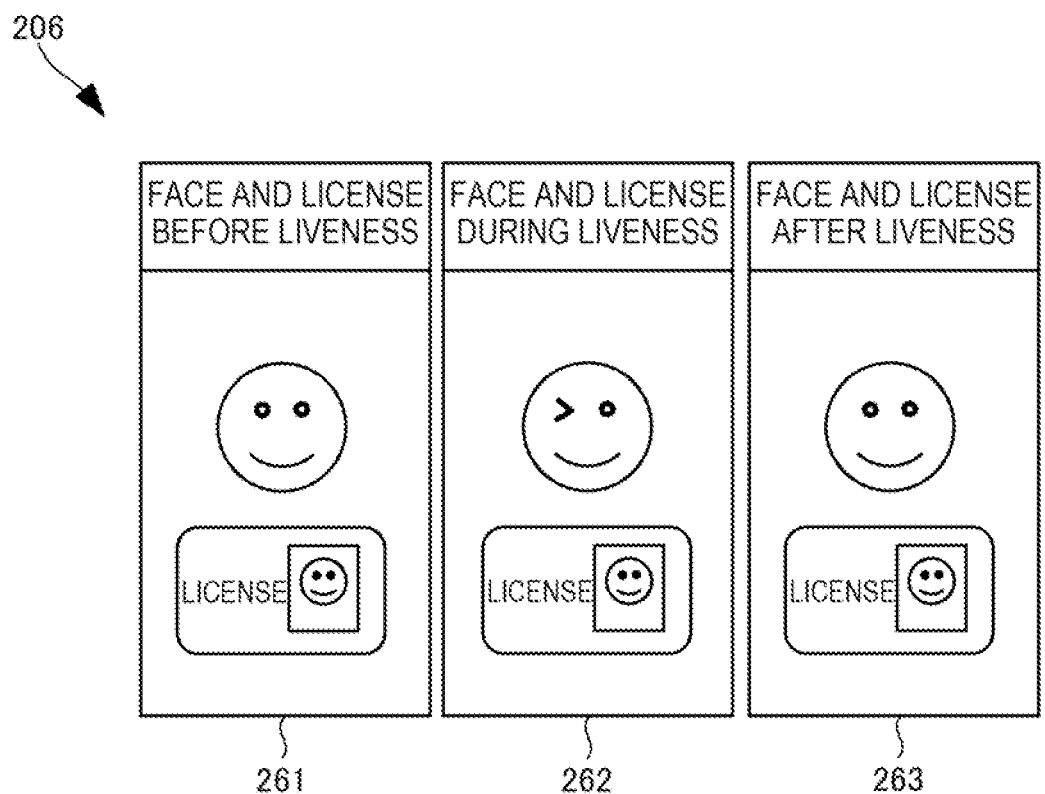
FIG. 2C is still other view for explaining an overview of the operation of the information processing apparatus according to the second example embodiment of the present invention.

FIG. 2C is still other view for explaining an overview of the operation of the information processing apparatus according to this example embodiment. FIG. 2C shows a view simplifying the identity verification screen 206. A timing at which the information processing apparatus 200 acquires the face image of the user will be described with reference to FIG. 2C.

For example, the information processing apparatus 200 acquires the feature of the face of the user at a timing (261) when the user captures his/her face and the identity verification document. That is, the information processing apparatus 200 acquires the feature of the face of the user at a timing before anti-spoofing authentication (liveness authentication) is performed for the user.

The information processing apparatus 200 acquires the captured face image of the user at a timing (262) while anti-spoofing authentication is executed for the user. Furthermore, the information processing apparatus 200 acquires the captured face image of the user at a timing (263) after anti-spoofing authentication for the user ends. As described above, the information processing apparatus 200 acquires the face images of the user at various timings.

Figure 3:
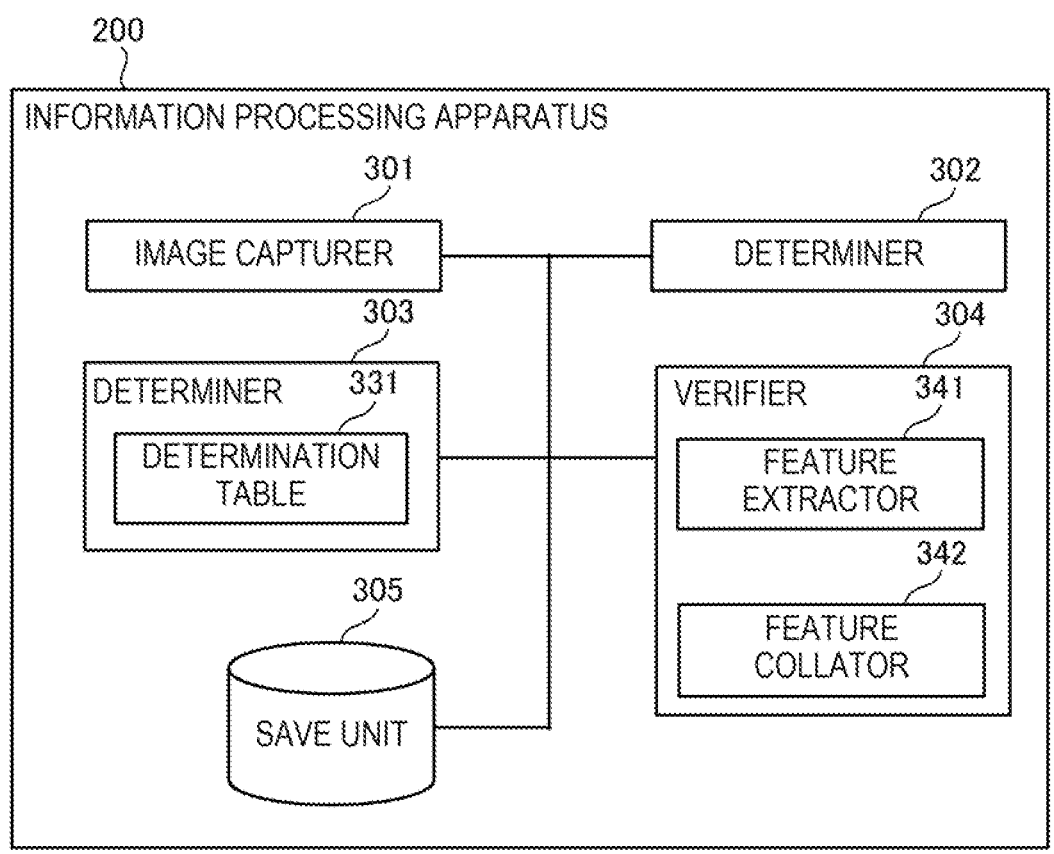
FIG. 3 is a block diagram showing the arrangement of the information processing apparatus according to the second example embodiment of the present invention.

FIG. 3 is a block diagram showing the arrangement of the information processing apparatus according to this example embodiment. The information processing apparatus 200 includes an image capturer 301, determiners 302 and 303, a verifier 304, and a save unit 305.

The image capturer 301 is a camera included in the information processing apparatus 200, and can capture a moving image and a still image. The image capturer 301 captures a moving image. For example, the image capturer 301 is a front camera (in-camera) of a smartphone or the like. When the user activates an application installed on the information processing apparatus 200, the camera of the information processing apparatus 200 is activated in the moving image mode, and a capturing frame for assisting moving image capturing is displayed on the display of the information processing apparatus 200. Then, the user captures a moving image in a way of selfie so that his/her face and the identity verification document fit in the predetermined frame displayed on the display. Note that the user captures a moving image so that his/her face fits in the predetermined frame displayed on the display. However, the user may capture a moving image of an upper body or full body. The moving image captured by the image capturer 301 is saved in, for example, the save unit 305. Note that the image capturer 301 may be provided outside the information processing apparatus 200.

The determiner 302 determines that the face of the user and the identity verification document are captured at the same time in the moving image captured by the image capturer 301. The user captures a moving image while, for example, holding the information processing apparatus 200 in one hand and holding the identity verification document in the other hand.

If the determiner 302 determines that the face of the user and the identity verification document are captured at the same time in the moving image captured by the image capturer 301, the determiner 303 notifies the user of an action instruction. The user is notified of the action instruction by, for example, displaying contents of the action instruction on the display of the information processing apparatus 200 or outputting a voice of the action instruction from the loudspeaker of the information processing apparatus 200. The determiner 303 performs anti-spoofing authentication with reference to, for example, a determination table 331, and determines whether the user changes his/her face (expression) in accordance with the instruction (action instruction).

Examples of the action instruction notified from the determiner 303 are winking the right eye (closing the right eye), winking the left eye (closing the left eye), closing both eyes, inclining the face to the right, inclining the face to the left, and turning the face to the front. The action instruction is not limited to them, and may include turning the face to the right, turning the face to the left, laughing (raising the corners of the mouth), moving the left and right eyebrows, furrowing his/her brow, opening the mouth, and closing the mouth. The action instruction is not limited to the example of changing the facial expression, as described above, and may be, for example, an instruction to move part of the body of the user such as an instruction to raise or lower a hand or foot. With respect to the action instructed to the user, each of the above-described actions may be instructed individually or a plurality of actions among the above-described actions may be instructed in combination.

When the determiner 303 determines whether the user acts in accordance with the action instruction, it is possible to prevent unauthorized account opening by spoofing and the like. That is, to ensure that user who is actually present is performing a procedure, the determination processing by the determiner 303 is performed. The determiner 303 performs so-called liveness authentication.

If the determiner 303 determines that the user acts in accordance with the action instruction, the verifier 304 verifies that the identity verification document corresponds to the user. That is, the verifier 304 verifies that the person of the face captured in the moving image captured by the user using the image capturer 301 of the information processing apparatus 200 is the same as that of the identity verification document captured in the same moving image.

The verification processing by the verifier 304 is performed by comparing the feature of the face captured in the captured moving image with that of the identity verification document. More specifically, the verifier 304 performs the verification processing, as follows.

The verifier 304 includes a feature extractor 341 and a feature collator 342. The feature extractor 341 acquires a moving image temporarily saved in the save unit 305. The feature extractor 341 extracts a still image from the acquired moving image. For example, the feature extractor 341 may extract, as a still image, an arbitrary one of frames forming the acquired moving image.

Then, the feature extractor 341 extracts a conspicuous feature from the face image of the user captured in the still image. For example, the feature extractor 341 extracts, as a feature, the relative position or size of a part (eye, nose, mouth, or the like) of the face, the shape of the eye, nose, cheekbone, or chin, or the like. The extracted feature (face feature) of the face of the user may be saved in the save unit 305. The face feature saved in the save unit 305 may be saved in linkage with the face image.

Furthermore, the feature extractor 341 acquires a moving image saved in the save unit 305, recognizes the image of the identity verification document from the acquired moving image, and extracts the feature of the recognized identity verification document. The feature extractor 341 extracts the feature of the face of a person captured in a photo portion of the identity verification document. Note that the feature of the identity verification document extracted by the feature extractor 341 is not limited to the feature of the face of the person captured in the photo portion of the identity verification document, and for example, the feature of the overall identity verification document may be extracted.

If, for example, the identity verification document is a driver's license, the feature extractor 341 cuts the face image of the user from the photo portion of the driver's license, and extracts the feature of the face from the cut face image. The feature of the identity verification document extracted by the feature extractor 341 may be saved in the save unit 305. The feature of the identity verification document saved in the save unit 305 may be saved in linkage with the image of the identity verification document.

The feature extractor 341 may extract the feature of the face of the user and the feature (the face feature or the like) of the identity verification document both of which are included in the moving image during the determination by the determiner 303. Note that the feature of the identity verification document may be extracted from an image of the identity verification document acquired at another timing. That is, extraction of the feature of the identity verification document is not limited to the example of extracting the feature of the identity verification document based on the moving image in which the face of the user and the identity verification document are captured at the same time.

The feature extractor 341 may extract the feature of the face of the user and the feature (the face feature or the like) of the identity verification document both of which are included in a moving image during a predetermined period before the determination by the determiner 303. Note that the feature of the identity verification document may be extracted from an image of the identity verification document acquired at another timing. That is, extraction of the feature of the identity verification document is not limited to the example of extracting the feature of the identity verification document based on the moving image in which the face of the user and the identity verification document are captured at the same time.

In addition, the feature extractor 341 may extract the feature of the face of the user and the feature (the face feature or the like) of the identity verification document both of which are included in a moving image during a predetermined period after the determination by the determiner 303. Note that the feature of the identity verification document may be extracted from an image of the identity verification document acquired at another timing. That is, extraction of the feature of the identity verification document is not limited to the example of extracting the feature of the identity verification document based on the moving image in which the face of the user and the identity verification document are captured at the same time.

The feature collator 342 collates the extracted face feature with the feature of the identity verification document. If, as a result of the collation, it is determined that the features match each other, the verifier 304 verifies that the identity verification document corresponds to the user.

In this example, the feature collator 342 collates, with each other, the feature of the face of the user and the feature (the face feature or the like) of the identity verification document both of which are included in the moving image during the determination by the determiner 303. Note that the feature of the identity verification document may be extracted from an image of the identity verification document acquired at another timing. That is, extraction of the feature of the identity verification document is not limited to the example of extracting the feature of the identity verification document based on the moving image in which the face of the user and the identity verification document are captured at the same time.

The feature collator 342 collates, with each other, the feature of the face of the user and the feature (the face feature or the like) of the identity verification document both of which are included in the moving image before the determination by the determiner 303. Note that the feature of the identity verification document may be extracted from an image of the identity verification document acquired at another timing. That is, extraction of the feature of the identity verification document is not limited to the example of extracting the feature of the identity verification document based on the moving image in which the face of the user and the identity verification document are captured at the same time.

The feature collator 342 collates, with each other, the feature of the face of the user and the feature (the face feature or the like) of the identity verification document both of which are included in the moving image after the determination by the determiner 303. Note that the feature of the identity verification document may be extracted from an image of the identity verification document acquired at another timing. That is, extraction of the feature of the identity verification document is not limited to the example of extracting the feature of the identity verification document based on the moving image in which the face of the user and the identity verification document are captured at the same time.

Collation between the features by the feature collator 342 is performed based on whether the features match each other. Note that not only when the features completely match each other but also when the features match each other at a predetermined rate, the feature collator 342 may determine that the features match each other. Therefore, if it is desirable to perform collation (identity authentication) more reliably, the features need to completely match each other. If collation (identity authentication) may be performed at a lower level, the features need not completely match each other. The level of collation by the feature collator 342 can arbitrarily be set. Note that the features extracted by the feature extractor 341, the collation result of the feature collator 342, and the like may be saved in the save unit 305.

FIG. 4 is a table showing an example of the determination table included in the information processing apparatus according to this example embodiment. The determination table 331 stores a liveness action 402 in association with a liveness instruction ID (IDentifier) 401. The liveness instruction ID 401 is an identifier for identifying an action instruction for anti-spoofing authentication (liveness authentication), that is instructed to the user. The liveness action 402 indicates contents of an action instructed to the user. Each of these actions may be used individually or a plurality of actions among the above-described actions may be used in combination. If the plurality of liveness actions 402 are used in combination, it is possible to perform spoofing authentication at a higher level. Then, for example, the determiner 303 issues an anti-spoofing authentication instruction to the user with reference to the determination table 331.

Figure 5:
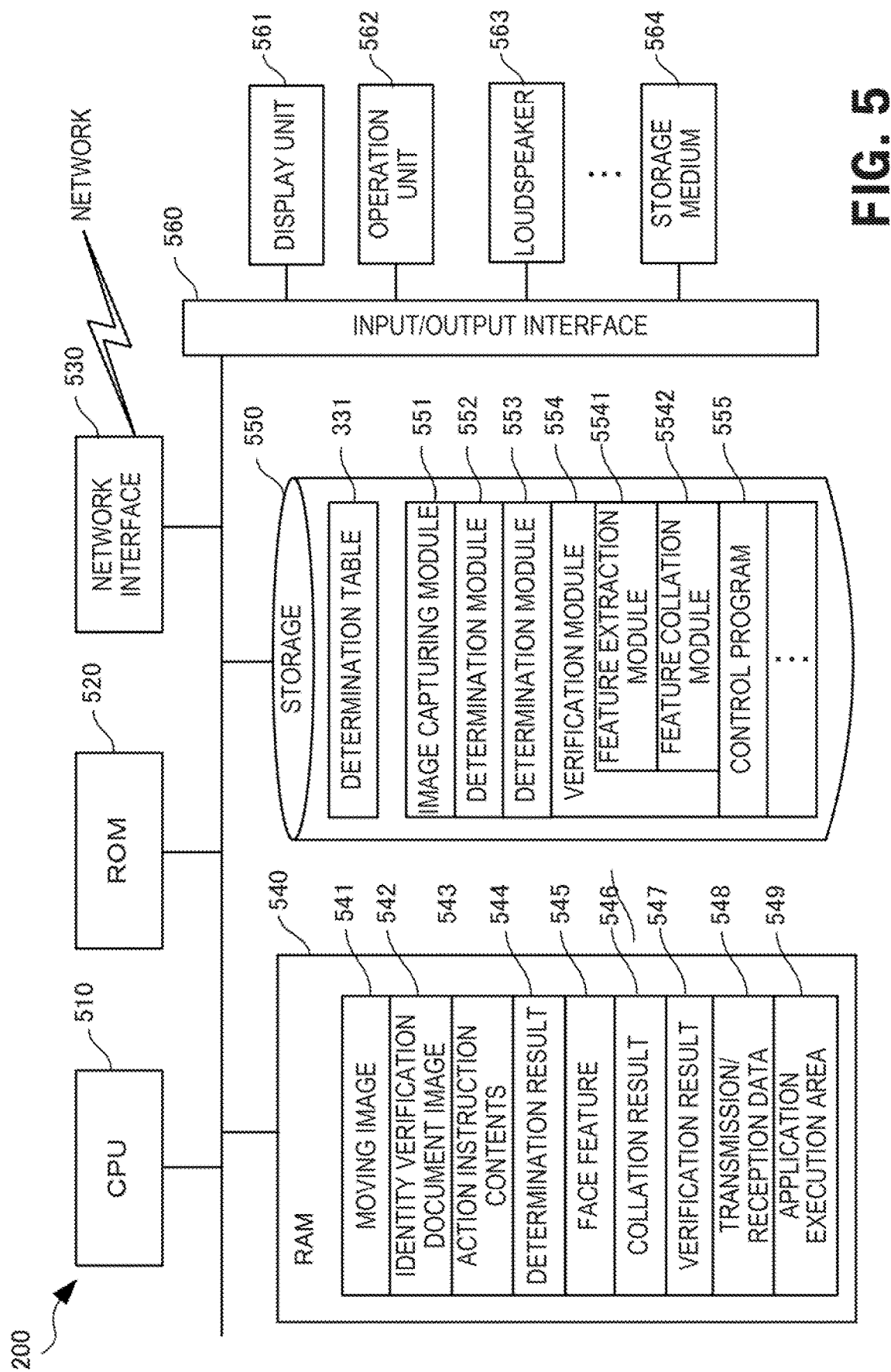
FIG. 5 is a block diagram showing the hardware arrangement of the information processing apparatus according to the second example embodiment of the present invention.

FIG. 5 is a block diagram for explaining the hardware arrangement of the information processing apparatus 200 according to this example embodiment. A CPU (Central Processing Unit) 510 is an arithmetic control processor, and implements the functional components of the information processing apparatus 200 shown in FIG. 3 by executing a program. The CPU 510 may include a plurality of processors to execute different programs, modules, tasks, or threads in parallel. A ROM (Read Only Memory) 520 stores permanent data such as initial data and a program, and other programs. A network interface 530 communicates with another apparatus via a network. Note that the number of CPUs 510 is not limited to one, and a plurality of CPUs or a GPU (Graphics Processing Unit) for image processing may be included. The network interface 530 desirably includes a CPU independent of the CPU 510, and writes or reads out transmission/reception data in or from the area of a RAM (Random Access Memory) 540. It is desirable to provide a DMAC (Direct Memory Access Controller) (not shown) for transferring data between the RAM 540 and a storage 550. Furthermore, the CPU 510 processes the data by recognizing that the data has been received by or transferred to the RAM 540. The CPU 510 prepares a processing result in the RAM 540, and delegates succeeding transmission or transfer to the network interface 530 or DMAC.

The RAM 540 is a random access memory used as a temporary storage work area by the CPU 510. An area to store data necessary for implementation of this example embodiment is allocated to the RAM 540. A moving image 541 is a moving image captured by the image capturer 301 of the information processing apparatus 200. An identity verification document image 542 is an image of an identity verification document such as a driver's license captured by the image capturer 301 of the information processing apparatus 200. Action instruction contents 543 are contents of an action instructed to the user for anti-spoofing authentication. A determination result 544 indicates a result of whether the face of the user and the identity verification document are captured in the moving image at the same time and a result of whether the user performs an action of, for example changing his/her face in accordance with the instruction. A face feature 545 includes the feature of the face of the user extracted from the captured moving image. The face feature 545 also includes the feature of the face of the user extracted from the image of the identity verification document. A collation result 546 is a result of collating the feature of the face of the user extracted from the captured moving image with that of the face of the user extracted from the image of the identity verification document. A verification result 547 is a result of verifying that the identity verification document corresponds to the user.

Transmission/reception data 548 is data transmitted/received via the network interface 530. The RAM 540 includes an application execution area 549 for executing various application modules.

The storage 550 stores a database, various parameters, or the following data or programs necessary for implementation of this example embodiment. The storage 550 stores the determination table 331. The determination table 331 is the table, shown in FIG. 4, for managing the relationship between the liveness instruction ID 401 and the liveness action 402.

The storage 550 also stores an image capturing module 551, determination modules 552 and 553, and a verification module 554. The verification module 554 includes a feature extraction module 5541 and a feature collation module 5542.

The image capturing module 551 is a module that captures a moving image. The determination module 552 is a module that determines that the face of the user and the identity verification document are captured in the moving image at the same time. The determination module 553 is a module that determines whether the user acts in accordance with an action instruction. The verification module 554 is a module that verifies that the identity verification document corresponds to the user. The feature extraction module 5541 is a module that extracts the feature of the face of the user and that of the identity verification document in the moving image. The feature collation module 5542 is a module that collates the extracted feature of the face with that of the identity verification document. These modules 551 to 554, 5541, and 5542 are read out by the CPU 510 into the application execution area 549 of the RAM 540, and executed. A control program 555 is a program for controlling the whole information processing apparatus 200.

An input/output interface 560 interfaces input/output data with an input/output device. The input/output interface 560 is connected to a display unit 561 and an operation unit 562. In addition, a storage medium 564 may be connected to the input/output interface 560. A loudspeaker 563 serving as a voice output unit, a microphone (not shown) serving as a voice input unit, or a GPS position determiner may also be connected. Note that programs and data which are associated with the general-purpose functions of the information processing apparatus 200 and other feasible functions are not shown in the RAM 540 or the storage 550 of FIG. 5.

Figure 6A:
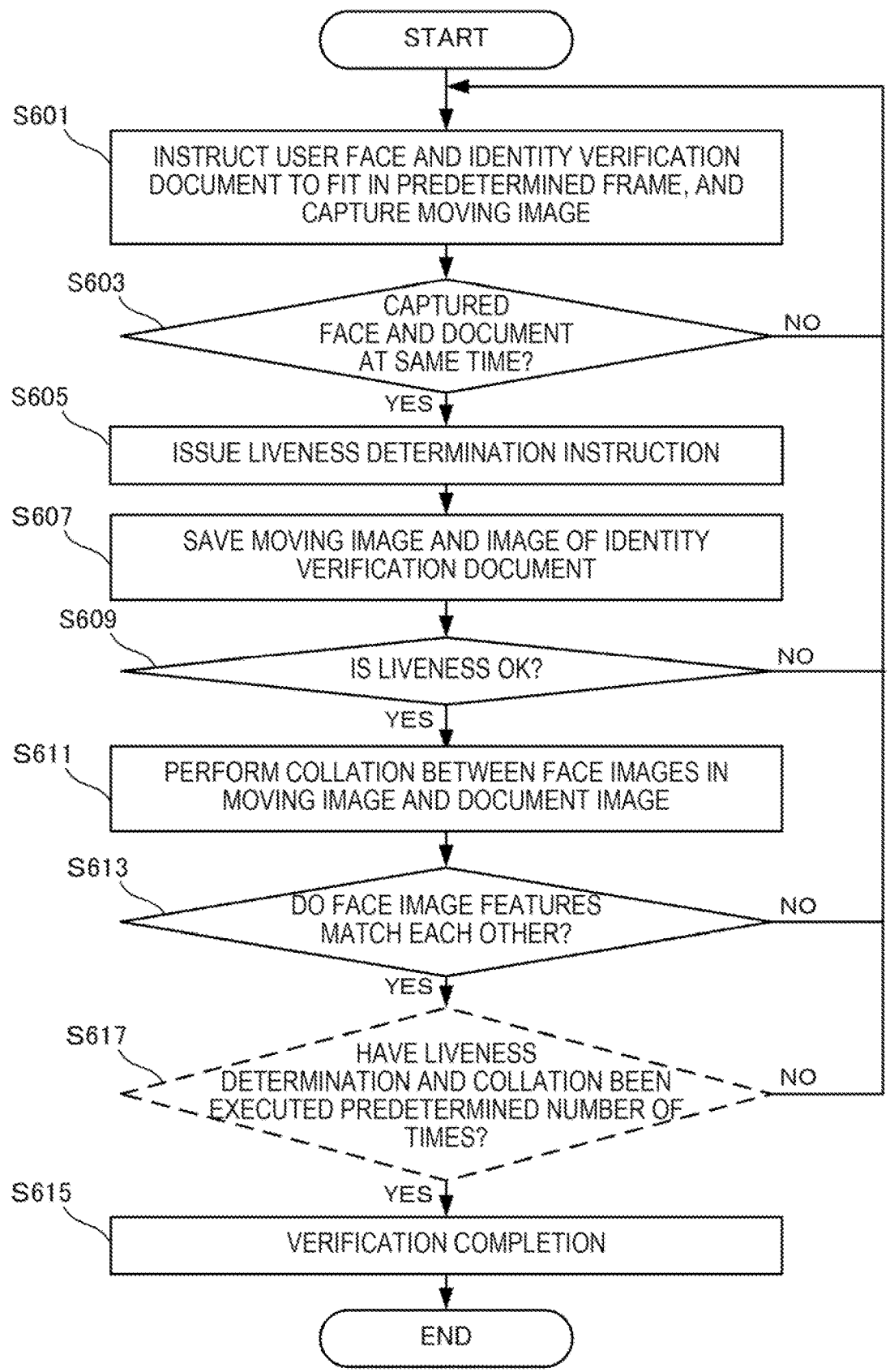
FIG. 6A is a flowchart for explaining the processing procedure of the information processing apparatus according to the second example embodiment of the present invention.
Figure 6B:
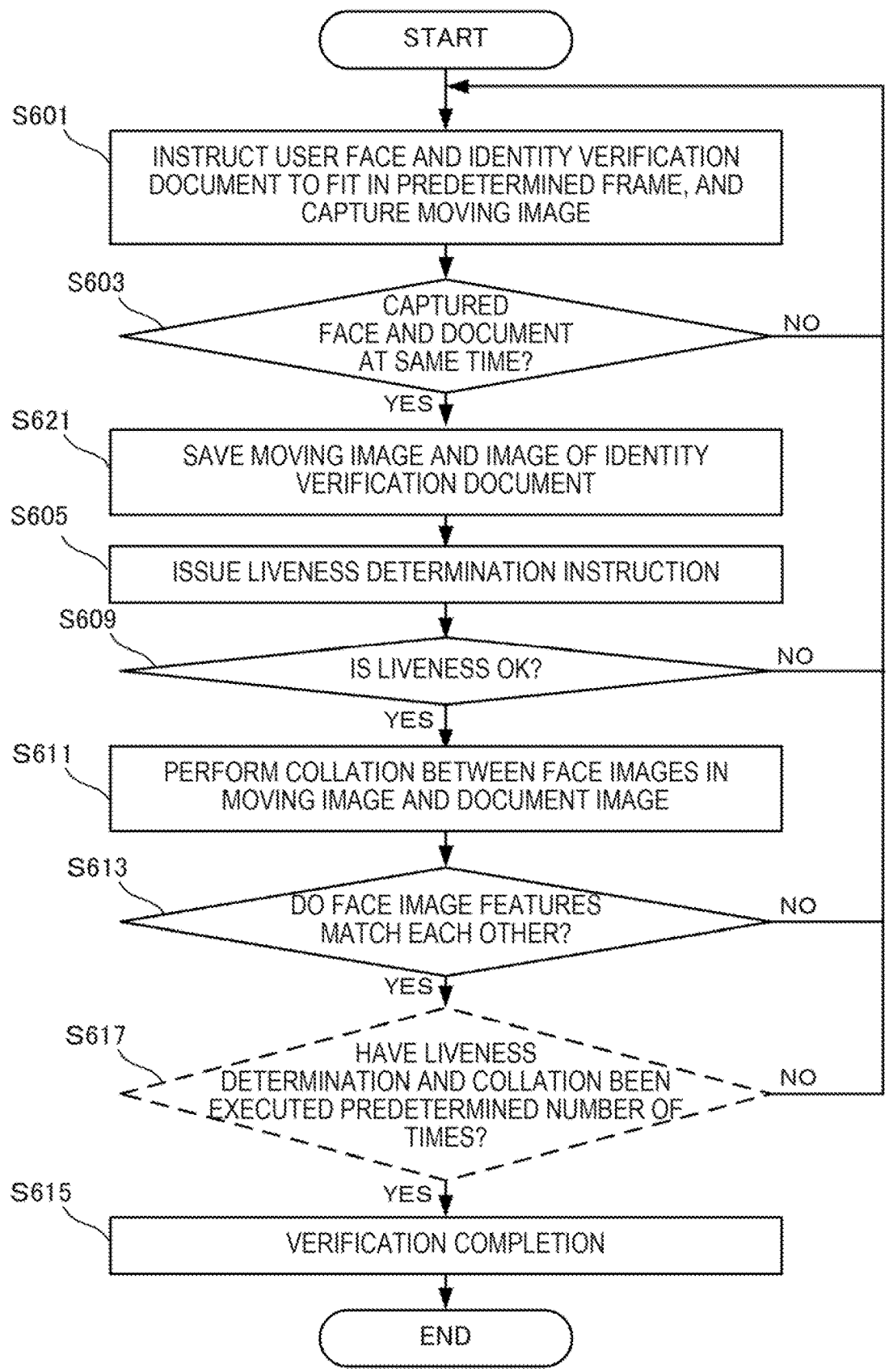
FIG. 6B is another flowchart for explaining the processing procedure of the information processing apparatus according to the second example embodiment of the present invention.
Figure 6C:
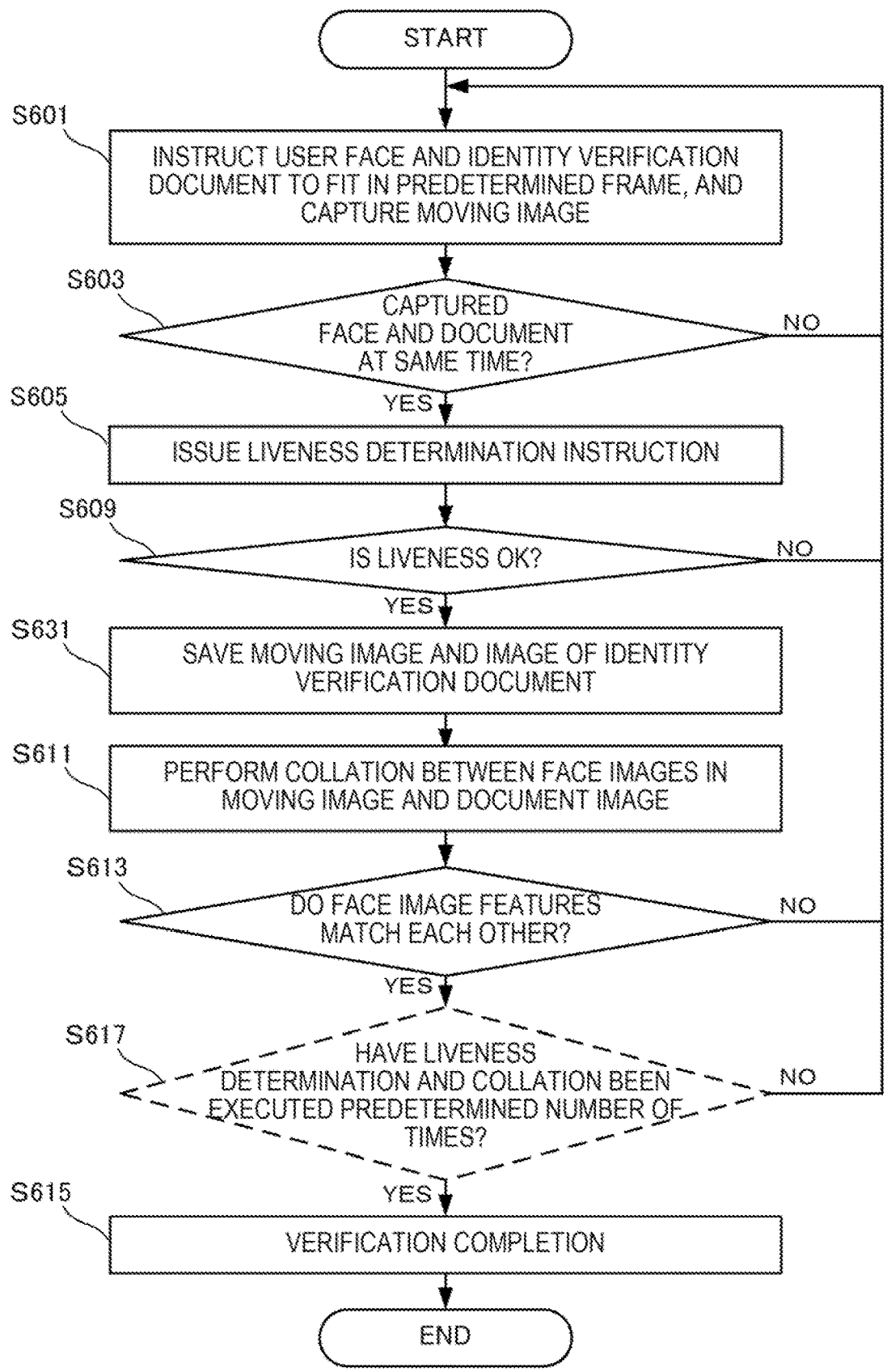
FIG. 6C is a still other flowchart for explaining the processing procedure of the information processing apparatus according to the second example embodiment of the present invention.

FIG. 6A is a flowchart for explaining the processing procedure of the information processing apparatus 200 according to this example embodiment. FIG. 6B is another flowchart for explaining the processing procedure of the information processing apparatus according to this example embodiment. FIG. 6C is still other flowchart for explaining the processing procedure of the information processing apparatus according to this example embodiment. These flowcharts are executed by the CPU 510 of FIG. 5 using the RAM 540, thereby implementing the functional components of the information processing apparatus 200 shown in FIG. 3.

The flowchart shown in FIG. 6A will be described first. In the flowchart shown in FIG. 6A, the face and the identity verification document included in the moving image during determination of liveness authentication are collated with each other.

In step S601, the information processing apparatus 200 instructs the face of the user and the identity verification document to fit in a predetermined frame. In this case, the information processing apparatus 200 captures the face of the user in the moving image mode. In step S603, the information processing apparatus 200 determines whether the face of the user and the identity verification document are captured in the moving image at the same time. If it is determined that the face of the user and the identity verification document are not captured at the same time (NO in step S603), the information processing apparatus 200 returns to step S601; otherwise (YES in step S603), the information processing apparatus 200 advances to step S605.

In step S605, the information processing apparatus 200 issues an instruction for anti-spoofing determination (liveness determination) to the user. In step S607, the information processing apparatus 200 saves the moving image and the image of the identity verification document. In step S609, the information processing apparatus 200 determines whether the user acts in accordance with an action instruction. If, for example, the instruction indicates a right eye wink, the information processing apparatus 200 determines whether the user winks his or her right eye. If the user does not act in accordance with the instruction (NO in step S609), the information processing apparatus 200 returns to step S601. Note that the information processing apparatus 200 may return to step S605 without returning to step S601, and issue again an instruction for anti-spoofing determination.

If the user acts in accordance with the instruction (YES in step S609), the information processing apparatus 200 advances to step S611. In step S611, the information processing apparatus 200 collates the face image of the user included in the moving image with the face image included in the identity verification document. That is, the information processing apparatus 200 performs collation using the moving image acquired and the image of the identity verification document during the anti-spoofing determination. The information processing apparatus 200 performs collation based on whether the features match each other. In step S613, the information processing apparatus 200 determines whether the face image features match each other. If it is determined that the face image features do not match each other (NO in step S613), the information processing apparatus 200 returns to step S601, and re-executes the processing from the first step.

If it is determined that the face image features match each other (YES in step S613), the information processing apparatus 200 advances to step S615. In step S615, the information processing apparatus 200 verifies that the identity verification document belongs to the user.

Note that the information processing apparatus 200 may execute step S617 between steps S613 and S615. In step S617, it is determined whether liveness determination (step S609) and collation between the face image features (step S613) have been executed a predetermined number of times. If it is determined that these processes have not been executed the predetermined number of times (NO in step S617), the information processing apparatus 200 returns to step S601; otherwise (YES in step S617), the information processing apparatus 200 advances to step S615. By executing step S617, step S613 is executed the number of times which corresponds to that of execution of step S609 (liveness determination). Liveness determination (step S609) may be executed repeatedly every time each step of FIG. 6A is executed, thereby verifying that liveness determination is continuous. The processing in step S617 may or may not be executed.

The flowchart shown in FIG. 6B will be described next. The flowchart shown in FIG. 6B is different from that shown in FIG. 6A, in that the face image included in a moving image and the face image included in the identity verification document during a predetermined period before the liveness determination are collated with each other. In step S621, the information processing apparatus 200 saves the moving image and the image of the identity verification document. That is, the information processing apparatus 200 saves the moving image and the image of the identity verification document at a timing before making a notification of an action instruction for liveness determination. Note that the timing before making a notification of an action instruction indicates, for example, a predetermined period (predetermined time) before the notification, more specifically, several sec before the notification. However, the present invention is not limited to this.

Finally, the flowchart shown in FIG. 6C will be described. The flowchart shown in FIG. 6C is different from those shown in FIGS. 6A and 6B, in that the face image included in a moving image and the face image included in the identity verification document during a predetermined period after the end of liveness determination are collated with each other. In step S631, the information processing apparatus 200 saves the moving image and the image of the identity verification document. That is, the information processing apparatus 200 saves the moving image and the image of the identity verification document at a timing after liveness determination. Note that the timing after liveness determination indicates, for example, a predetermined period (predetermined time) after liveness determination, more specifically, several sec after determination. However, the present invention is not limited to this.

According to this example embodiment, it is possible to reduce the labor to input user information necessary for eligibility examination. Furthermore, since the information processing apparatus 200 extracts the feature of the face of the user from each of moving images captured at various timings and saves it, and also saves the image of the identity verification document, it is possible to improve the accuracy of identity verification. In addition, since the user does not know which of the moving images captured at various timings is used to extract the feature, the feature can be extracted from the moving image of the face in a more natural state, thereby improving the accuracy of face determination and further improving the accuracy of identity verification.

Third Example Embodiment

Figure 7:
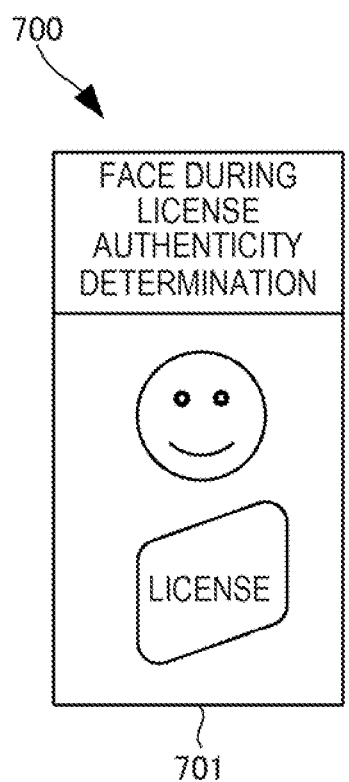
FIG. 7 is a view for explaining an overview of the operation of an information processing apparatus according to the third example embodiment of the present invention.

An information processing apparatus according to the third example embodiment of the present invention will be described next with reference to FIGS. 7 to 9. FIG. 7 is a view for explaining an overview of the operation of the information processing apparatus according to this example embodiment. The information processing apparatus according to this example embodiment is different from that according to the above-described second example embodiment in that the face of the user included in a moving image during determination of authenticity of an identity verification document is collated with a face included in the identity verification document. The remaining components and operations are similar to those in the second example embodiment. Hence, the same reference numerals denote similar components and operations, and a detailed description thereof will be omitted.

If an identity verification document presented by the user is a driver's license, an information processing apparatus 700 determines whether the driver's license is authentic or fake. That is, the information processing apparatus 700 determines authenticity of the driver's license presented by the user. Then, the information processing apparatus 700 collates the face of the user included in a moving image during determination of authenticity of the driver's license with the face included in the identity verification document. That is, as the face of the user, the face included in the moving image during the authenticity determination is used. Note that as the face included in the identity verification document, the face included in the identity verification document acquired at another timing or the face of the identity verification document included in the moving image during the authenticity determination may be used.

Figure 8:
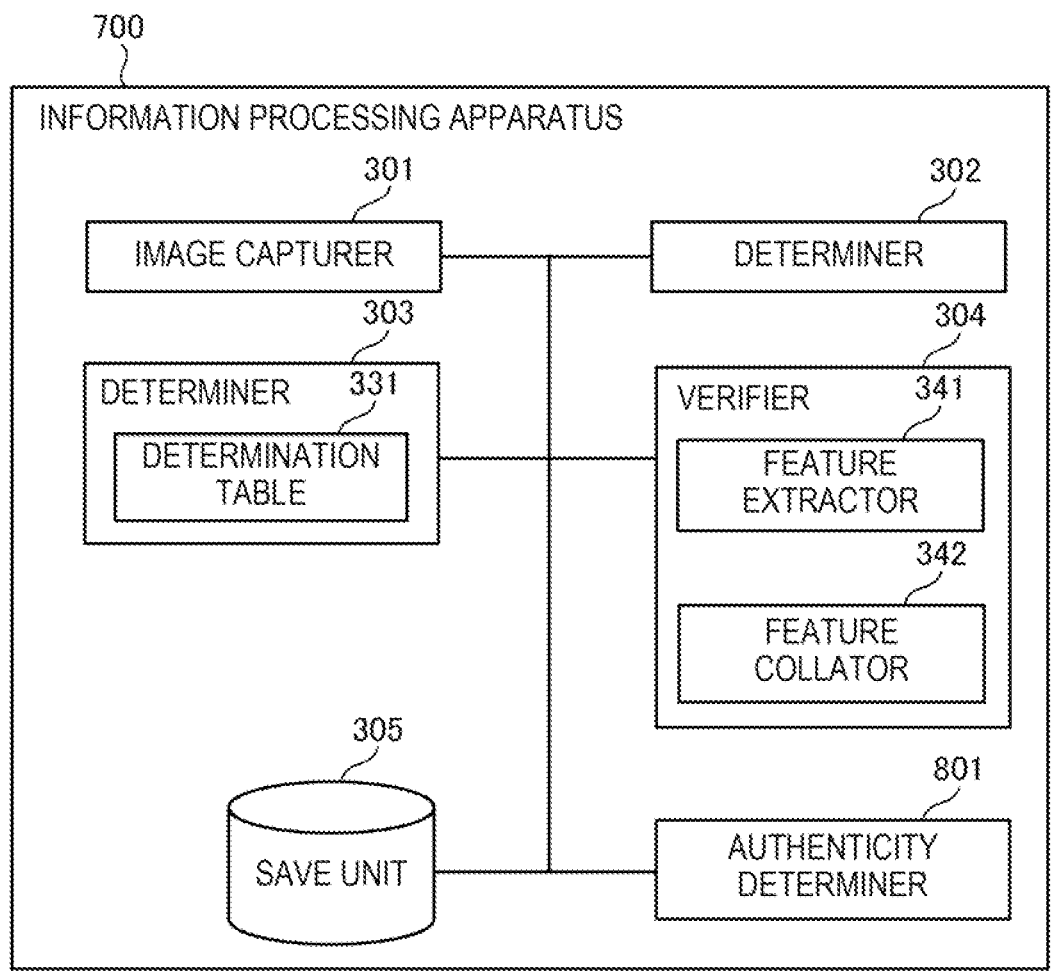
FIG. 8 is a block diagram showing the arrangement of the information processing apparatus according to the third example embodiment of the present invention.

FIG. 8 is a block diagram showing the arrangement of the information processing apparatus according to this example embodiment. The information processing apparatus 700 includes an authenticity determiner. An authenticity determiner 801 determines authenticity of an identity verification document, for example, a driver's license. In determination of authenticity of the driver's license, for example, the information processing apparatus 700 instructs the user to show the back side of the driver's license while the face of the user and the driver's license are displayed on a display 701 of the information processing apparatus 700 at the same time. The authenticity determiner 801 reads a range that does not require a PIN (Personal Identification Number), for example, a common area of an IC (Integrated Circuit) chip of the driver's license, and confirms whether data is entered in an appropriate format, thereby determining authenticity. The IC chip is read by, for example, an IC card reader optionally connected to the information processing apparatus 700, or the like. Note that the IC card reader may be incorporated in the information processing apparatus 700.

If the authenticity determiner 801 determines that the driver's license is authentic, a feature collator 342 collates the feature of the face of the user included in the moving image during the authenticity determination with that of the face included in the driver's license. If, as a result of the collation processing, the features match each other, a verifier 304 verifies that the driver's license corresponds to the user.

Figure 9:
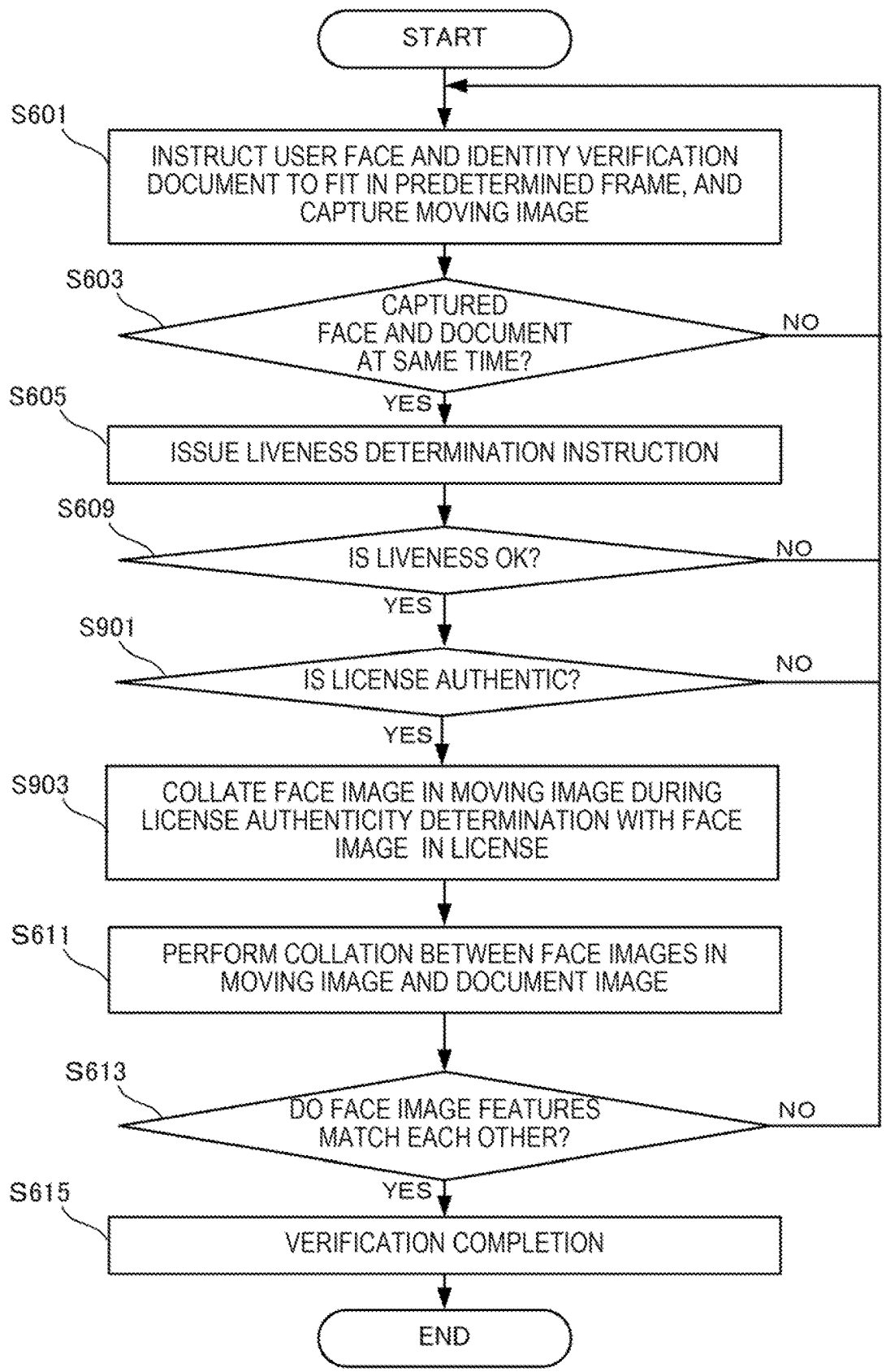
FIG. 9 is a flowchart for explaining the processing procedure of the information processing apparatus according to the third example embodiment of the present invention.

FIG. 9 is a flowchart for explaining the processing procedure of the information processing apparatus according to this example embodiment. In step S901, the information processing apparatus 700 determines authenticity of the driver's license. If, as a result of the determination processing, the driver's license is fake (NO in step S901), the information processing apparatus 700 returns to step S601; otherwise (YES in step S901), the information processing apparatus 700 advances to step S903. In step S903, the information processing apparatus 700 collates the feature of the face of the user included in the moving image during the authenticity determination with that the feature of the face included in the driver's license.

According to this example embodiment, it is possible to reduce the labor to input user information necessary for eligibility examination. Furthermore, since collation is performed using the face of the user included in the moving image during the determination of authenticity of the identity verification document and the like, the accuracy of collation and face determination improves, thereby making it possible to further improve the accuracy of identity verification. In addition, since the moving image during the determination of authenticity of the identity verification document is used, it is possible to perform collation using the face of the user with more natural expression and the like, thereby performing more correct collation.

Fourth Example Embodiment

Figure 10:
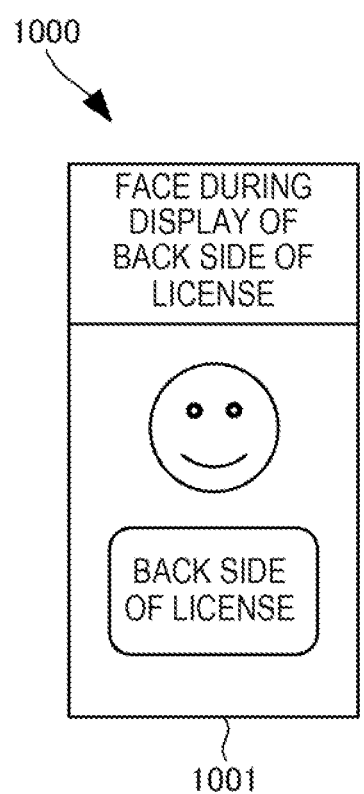
FIG. 10 is a view for explaining an overview of the operation of an information processing apparatus according to the fourth example embodiment of the present invention.

An information processing apparatus according to the fourth example embodiment of the present invention will be described next with reference to FIGS. 10 to 12. FIG. 10 is a view for explaining an overview of the operation of the information processing apparatus according to this example embodiment. The information processing apparatus according to this example embodiment is different from those according to the above-described second and third example embodiments in that the face of the user included in a moving image during determination whether the back side of an identity verification document is captured is collated with a face included in the front side of the identity verification document. The remaining components and operations are similar to those in the second and third example embodiments. Hence, the same reference numerals denote similar components and operations, and a detailed description thereof will be omitted.

An information processing apparatus 1000 captures the back side of a driver's license presented as an identity verification document by the user, and collates, with a face included in the identity verification document, the face of the user included in a moving image during determination (back side license determination) of whether the back side of the driver's license is captured. That is, as the face of the user, the face included in the moving image during the back side license determination is used. Note that as the face included in the identity verification document, the face included in the identity verification document acquired at another timing or the face of the identity verification document included in the moving image during the back side license determination may be used.

Figure 11:
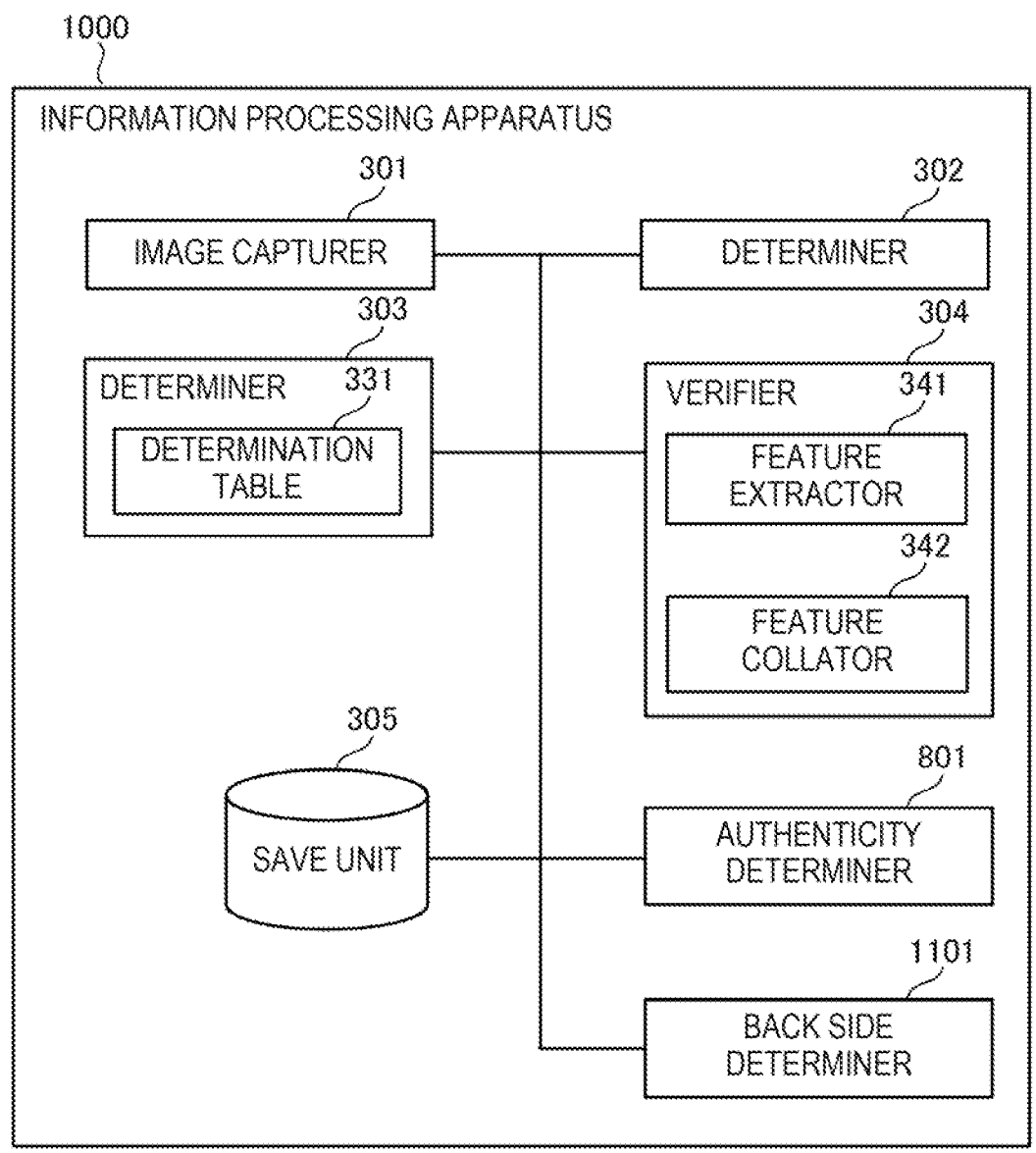
FIG. 11 is a block diagram showing the arrangement of the information processing apparatus according to the fourth example embodiment of the present invention.

FIG. 11 is a block diagram showing the arrangement of the information processing apparatus according to this example embodiment. The information processing apparatus 1000 includes a back side determiner 1101. The back side determiner 1101 determines whether the back side of an identity verification document, for example, a driver's license is captured. If the back side determiner 1101 determines that the back side of the driver's license is captured, a feature collator 342 collates the feature of the face of the user included in the moving image during the back side determination with that of the face included in the driver's license. If, as a result of the collation processing, the features match each other, a verifier 304 verifies that the driver's license corresponds to the user.

Figure 12:
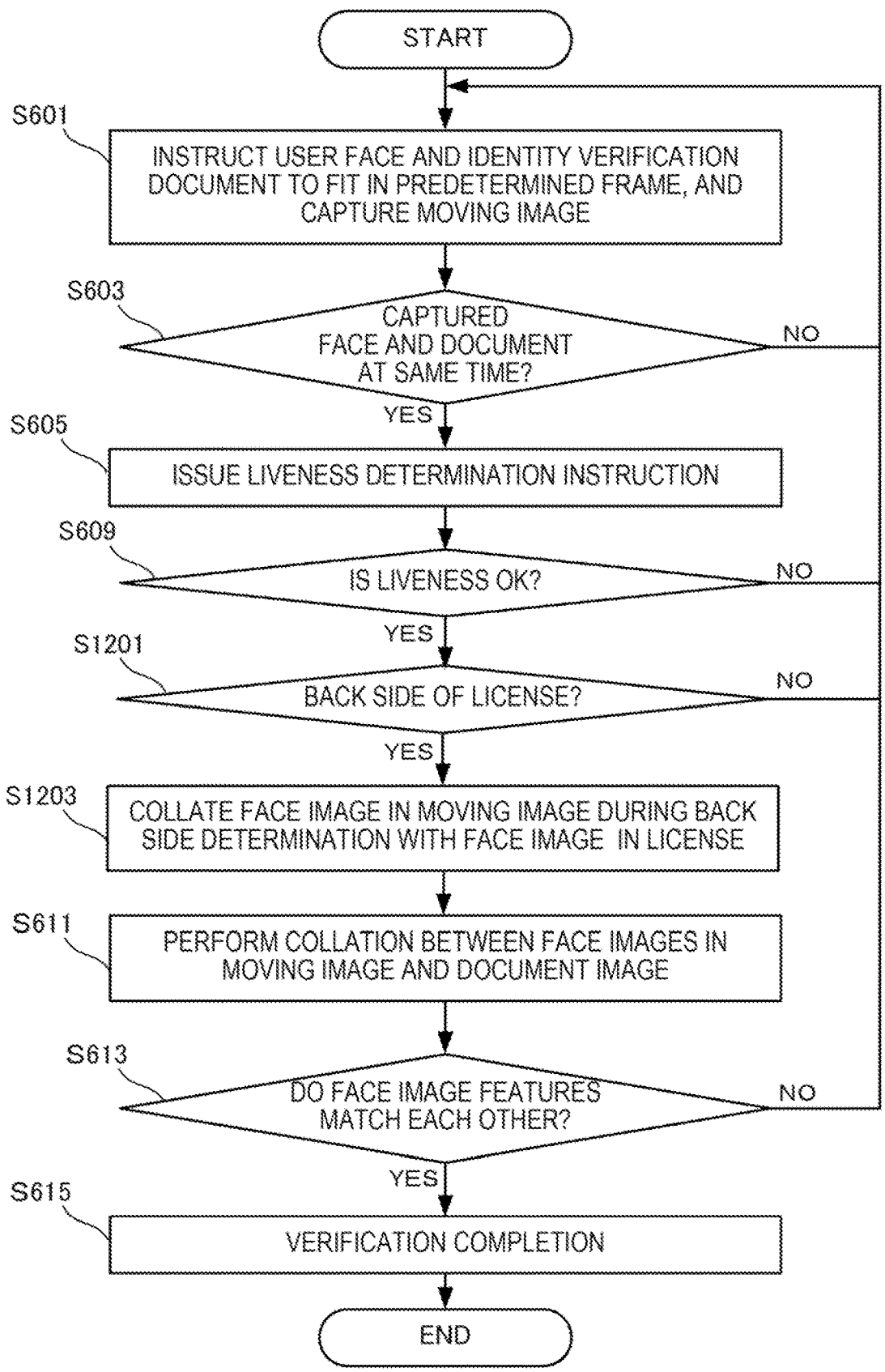
FIG. 12 is a flowchart for explaining the processing procedure of the information processing apparatus according to the fourth example embodiment of the present invention.

FIG. 12 is a flowchart for explaining the processing procedure of the information processing apparatus according to this example embodiment. In step S1201, the information processing apparatus 1000 determines whether the back side of the driver's license is captured. If, as a result of the determination processing, it is determined that the back side of the license is not captured (NO in step S1201), the information processing apparatus 1000 returns to step S601; otherwise, the information processing apparatus 1000 advances to step S1203. In step S1203, the information processing apparatus 1000 collates the feature of the face of the user included in the moving image during the back side license determination with that the feature of the face included in the front side of the driver's license.

According to this example embodiment, it is possible to reduce the labor to input user information necessary for eligibility examination. Furthermore, since collation is performed using the face of the user included in the moving image during the determination of the back side of the identity verification document and the like, the accuracy of collation and face determination improves, thereby making it possible to further improve the accuracy of identity verification. In addition, since the moving image during the determination of the back side of the identity verification document is used, it is possible to perform collation using the face of the user with more natural expression and the like, thereby performing more correct collation.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. An information processing apparatus comprising:
    a first determiner that determines whether a face of a user and an identity verification document are captured in a moving image at a same time;
    a second determiner that makes, when said first determiner determines that the face and the identity verification document are captured at the same time, a notification of an action instruction, and determines whether the user acts in accordance with the action instruction; and
    a verifier that verifies, when said second determiner determines that the user acts in accordance with the action instruction, that the identity verification document belongs to the user.

2. The information processing apparatus according to claim 1, further comprising a first collator that collates a first face image of the user with a second face image included in the identity verification document, wherein the first and second face images are included in the moving image during the determination by said second determiner,
    wherein said verifier verifies that the identity verification document belongs to the user, by further referring to a collation result of said first collator.

3. The information processing apparatus according to claim 2, further comprising a second collator that collates a third face image of the user with a fourth face image included in the identity verification document, wherein the third and fourth face images are included in the moving image before the determination by said second determiner,
    wherein said verifier verifies that the identity verification document belongs to the user, by further referring to a collation result of said second collator.

4. The information processing apparatus according to claim 3, further comprising a third collator that collates a fifth face image of the user with a sixth face image included in the identity verification document, wherein the fifth and sixth face images are included in the moving image after the determination by said second determiner,
    wherein said verifier verifies that the identity verification document belongs to the user, by further referring to a collation result of said third collator.

5. The information processing apparatus according to claim 2, further comprising a third collator that collates a fifth face image of the user with a sixth face image included in the identity verification document, wherein the fifth and sixth face images are included in the moving image after the determination by said second determiner,
    wherein said verifier verifies that the identity verification document belongs to the user, by further referring to a collation result of said third collator.

6. The information processing apparatus according to claim 2, further comprising:
    an authenticity determiner that determines authenticity of the identity verification document; and
    a fourth collator that collates a seventh face image of the user with a eighth face image included in the identity verification document, wherein the seventh and eighth face images are included in the moving image during authenticity determination.

7. The information processing apparatus according to claim 6, further comprising:
    a back side determiner that determines whether a back side of the identity verification document is captured; and
    a fifth collator that collates a nine face image of the user included in the moving image with a tenth face image included in a front of the identity verification document, during back side determination.

8. The information processing apparatus according to claim 2, further comprising:

a back side determiner that determines whether a back side of the identity verification document is captured; and a fifth collator that collates a ninth face image of the user included in the moving image with a tenth face image included in a front of the identity verification document, during back side determination.

9. The information processing apparatus according to claim 2, further comprising:

a back side determiner that determines whether a back side of the identity verification document is captured; and a fifth collator that collates a ninth face image of the user included in the moving image with a tenth face image included in a front of the identity verification document, during back side determination.

10. The information processing apparatus according to claim 1, further comprising a second collator that collates a third face image of the user with a fourth face image included in the identity verification document, wherein the third and fourth face images are included in the moving image before the determination by said second determiner, wherein said verifier verifies that the identity verification document belongs to the user, by further referring to a collation result of said second collator.

11. The information processing apparatus according to claim 10, further comprising a third collator that collates a fifth face image of the user with a sixth face image included in the identity verification document, wherein the fifth and sixth face images are included in the moving image after the determination by said second determiner, wherein said verifier verifies that the identity verification document belongs to the user, by further referring to a collation result of said third collator.

12. The information processing apparatus according to claim 10, further comprising:

an authenticity determiner that determines authenticity of the identity verification document; and a fourth collator that collates a seventh face image of the user with to eighth face image included in the identity verification document, wherein the seventh and eighth face images are included in the moving image during authenticity determination.

13. The information processing apparatus according to claim 10, further comprising:

a back side determiner that determines whether a back side of the identity verification document is captured; and a fifth collator that collates a ninth face image of the user included in the moving image with a tenth face image included in a front side of the identity verification document, during back side determination.

14. The information processing apparatus according to claim 1, further comprising a third collator that collates a fifth face image of the user with a sixth face image included in the identity verification document, wherein the fifth and sixth face images are included in the moving image after the determination by said second determiner, wherein said verifier verifies that the identity verification document belongs to the user, by further referring to a collation result of said third collator.

15. The information processing apparatus according to claim 14, further comprising:

an authenticity determiner that determines authenticity of the identity verification document; and a fourth collator that collates a seventh face image of the user with a eighth face image included in the identity verification document, wherein the seventh and eighth face images are included in the moving image during authenticity determination.

16. The information processing apparatus according to claim 1, further comprising:

an authenticity determiner that determines authenticity of the identity verification document; and a fourth collator that collates a seventh face image of the user with a eighth face image included in the identity verification document, wherein the seventh and eighth face images are included in the moving image during authenticity determination.

17. The information processing apparatus according to claim 16, further comprising:

a back side determiner that determines whether a back side of the identity verification document is captured; and a fifth collator that collates a ninth face image of the user included in the moving image with a tenth face image included in a front of the identity verification document, during back side determination.

18. The information processing apparatus according to claim 1, further comprising:

a back side determiner that determines whether a back side of the identity verification document is captured; and a fifth collator that collates a ninth face image of the user included in the moving image with a tenth face image included in a front side of the identity verification document, during back side determination.

19. An information processing method comprising:

determining whether a face of a user and an identity verification document are captured in a moving image at a same time;

making, when it is determined that the face and the identity verification document are captured at the same time, a notification of an action instruction, and determining whether the user acts in accordance with the action instruction; and verifying, when it is determined that the user acts in accordance with the action instruction, that the identity verification document belongs to the user.

20. A non-transitory computer-readable storage medium storing an information processing program for causing a computer to execute a method, comprising:

determining whether a face of a user and an identity verification document are captured in a moving image at a same time;

making, when it is determined that the face and the identity verification document are captured at the same time, a notification of an action instruction, and determining whether the user acts in accordance with the action instruction; and verifying, when it is determined that the user acts in accordance with the action instruction, that the identity verification document belongs to the user.

* * * * *